United States Patent

Saito et al.

[11] Patent Number: 5,442,916
[45] Date of Patent: Aug. 22, 1995

[54] CONTROL VALVE ASSEMBLY FOR TOTAL PRESSURE HYDRAULIC BRAKE

[75] Inventors: Kazuo Saito, Tokyo; Takao Yasuda, Tochigi; Toru Oyama, Oyama, all of Japan

[73] Assignee: Miyako Jidosha Kogyo Kabushikigaisha, Tokyo, Japan

[21] Appl. No.: 171,605

[22] Filed: Dec. 21, 1993

[30] Foreign Application Priority Data

Dec. 25, 1992 [JP] Japan .................. 4-357703

[51] Int. Cl.⁶ .................. B60T 13/00; B60T 11/00
[52] U.S. Cl. .................. 60/547.1; 60/581; 188/359
[58] Field of Search ............ 91/376 R; 60/470, 547.1, 60/561, 574, 581; 188/358, 359; 303/113.3, 89

[56] References Cited

U.S. PATENT DOCUMENTS

| | | | |
|---|---|---|---|
| 3,683,619 | 8/1972 | Belart | 188/359 X |
| 4,435,960 | 3/1984 | Farr | 60/547.1 |
| 4,703,978 | 11/1987 | Belart et al. | 60/547.1 X |
| 4,950,027 | 8/1990 | Reinartz et al. | 303/113.3 X |
| 4,951,776 | 8/1990 | Jeter | 303/89 X |
| 5,066,077 | 11/1991 | Farr | 303/114 R |
| 5,114,215 | 5/1992 | Benzinger et al. | 303/113.3 X |

*Primary Examiner*—Edward K. Look
*Assistant Examiner*—Hoang Nguyen
*Attorney, Agent, or Firm*—Collard & Roe

[57] ABSTRACT

A control valve assembly for a total pressure hydraulic brake is provided with an input port, and output port, a remote control input port connected to a hydraulic fluid supply, a first response which is moved together with depression of a brake pedal, a second response which is moved by the hydraulic fluid flowing through the remote control input port, and a control valve which operates in accordance with the movement of either the first or the second response. The control valve supplies the hydraulic fluid from the input port to the output port in response to the hydraulic fluid flowing through the remote control input port, as well as the depressing force exerted on the brake pedal.

5 Claims, 1 Drawing Sheet

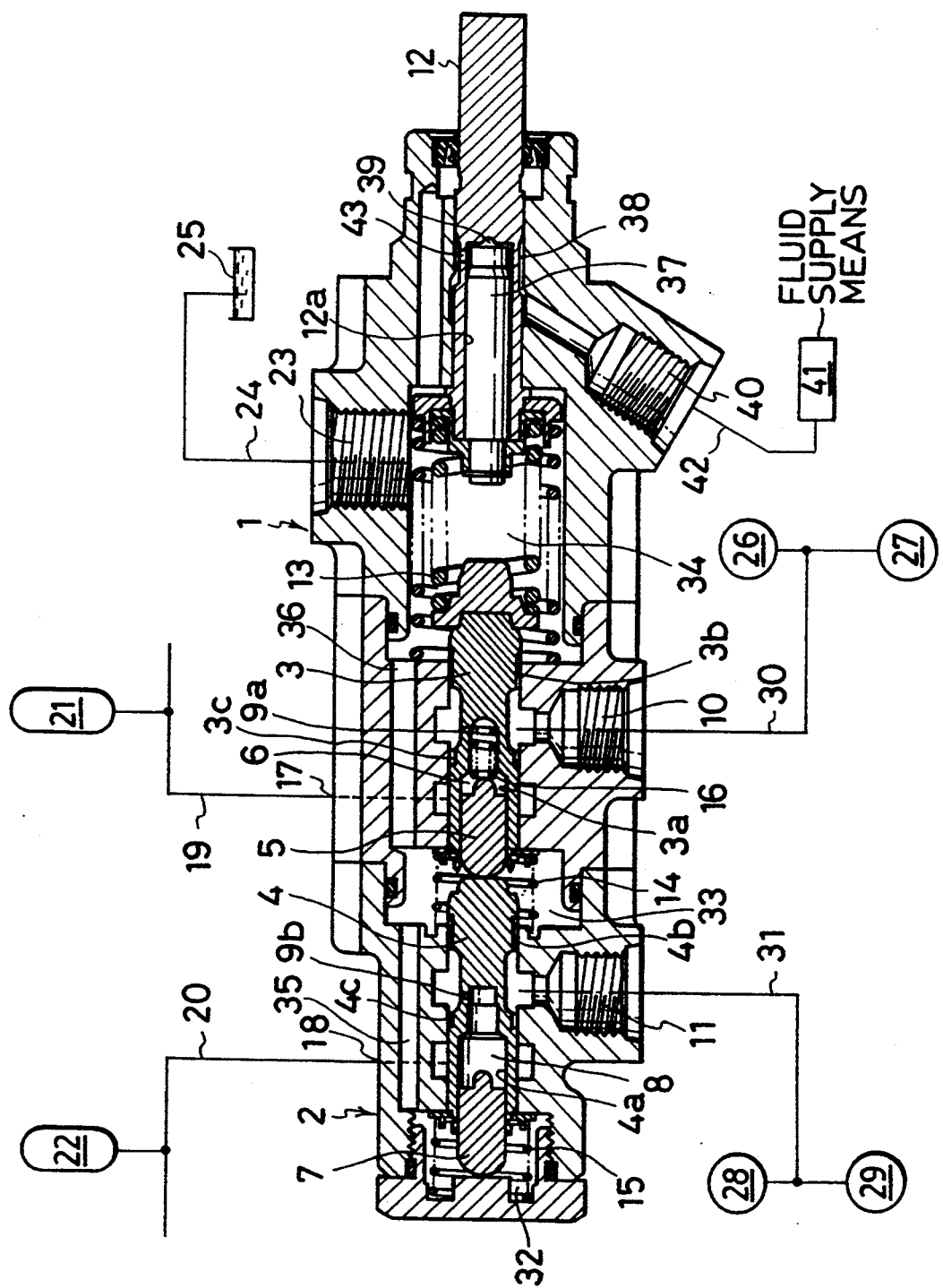

CONTROL VALVE ASSEMBLY FOR TOTAL PRESSURE HYDRAULIC BRAKE

BACKGROUND OF THE INVENTION

1. Field of the Invention

The present invention relates to an improvement of a control valve assembly for a total pressure hydraulic brake of a single or dual system in a vehicle or the like.

2. Description of the Prior Art

A total pressure hydraulic brake system wherein a hydraulic fluid stored in an accumulator by means of a hydraulic fluid source such as a hydraulic pump or the like is fed directly to end brakes through a control valve assembly has already been known. In such a total pressure hydraulic brake system, the end brakes can be actuated by operation of only the control valve assembly, so even in the case where the amount of fluid required in the end brakes is large, the brakes can be actuated by a small amount of operation and a small force. Because of this advantage, the total pressure hydraulic brake system is used in vehicles for construction or for industrial use, etc.

According to the structure of this type of system, the valve rod in the control valve assembly can be operated not only mechanically but also by a remote control. However, by making a remote control possible, a complicated link mechanism is needed. Further, since the mounting space in a vehicle is narrow, a considerable time is required for the mounting work.

SUMMARY OF THE INVENTION

It is the object of the present invention to provide a control valve assembly for a total pressure hydraulic brake not requiring the mounting work for a remote control member and capable of being remotely controlled by a simple structure.

The control valve assembly according to the present invention is provided with an input port connected inputtably to hydraulic fluid supply means for brake, an output port connected outputtably to a brake system, a remote control input port connected inputtably to hydraulic fluid supply means for remote control, a first response member which is moved in accordance with a depressing force exerted on a brake pedal, a second response member which is moved by the hydraulic fluid flowing through the remote control input port, and control means which makes open/close control for the hydraulic fluid from the input port in accordance with the movement of either the first or the second response member and supplies the hydraulic fluid to the output port. According to this construction, not only the mounting work for a remote control member such as the conventional link mechanism can be omitted but also a remote control can be made by a simple structure.

BRIEF DESCRIPTION OF THE DRAWING

FIGURE 1 is a sectional view showing a control valve assembly for a total pressure hydraulic brake according to an embodiment of the present invention.

DETAILED DESCRIPTION OF THE PREFERRED EMBODIMENT

Referring to FIGURE 1, there is illustrated a section of a control valve assembly for a total pressure hydraulic brake of a dual system according to an embodiment of the present invention.

In FIGURE 1, the numeral 1 denotes a primary housing and numeral 2 denotes a secondary housing. The control valve assembly is mainly composed of these housings. Numerals 3 and 4 denote first and second spool valves, respectively, which are disposed within those housings. Holes 3a and 4a each having a predetermined diameter are formed within the first and second spool valves, respectively. Numeral 5 denotes a plunger disposed within the hole 3a of the first spool valve 3 and which forms a reaction hydraulic-pressure chamber 6 conjointly with the inner wall of the hole 3a, while numeral 7 denotes a plunger disposed within the hole 4a of the second spool valve 4 and which forms a reaction hydraulic-pressure chamber 8 together with the inner wall of the hole 4a. Numeral 9a denotes a small hole to provide communication between an end brake port 10 and the reaction hydraulic-pressure chamber 6, while numeral 9b denotes a small hole for communication between an end brake port 11 and the reaction hydraulic-pressure chamber 8.

Numeral 12 denotes a piston adapted to move in the right and left directions (axial directions) in response to depression of a brake pedal (not shown). The piston 12 is internally provided with a pilot piston 37 which will be described later. Numeral 13 denotes a spring which is compressed upon leftward movement of the piston 12 and which transmits such compressive load to the first spool valve 3 and also transmits the actuating force of the pilot piston 37 to the first spool valve 3. Numeral 14 denotes a return spring for returning the first spool valve 3 to its initial position (the illustrated state); numeral 15 denotes a return spring for returning the second spool valve 4 to its initial position (the illustrated state); and numeral 16 denotes a spring which is compressed by the operation of the first spool valve 3 and which transmits such compressive load to the second spool valve 4 through the plunger 5.

Numerals 17 and 18 denote accumulator ports connected through pipes 19 and 20 to accumulators 21 and 22 which are hydraulic fluid supply means. Numeral 23 denotes a drain port connected to an oil tank 25 through a pipe 24. Numerals 26, 27, 28 and 29 denote end brakes connected to the end brake ports 10 and 11 through pipes 30 and 31.

Numerals 32, 33 and 34 denote hydraulic pressure release chambers. The chambers 32 and 33 are in communication with each other through a passage 35 formed in the secondary housing 2, while the chambers 33 and 34 are in communication with each other through a passage 36 formed in the primary housing 1. The drain port 23 is provided in the chamber 34. While the second spool valve 4 is in its illustrated state, the hydraulic pressure release chamber 33 is communicated with the end brake port 11 through a first output groove 4b formed in the second spool valve 4, and while the first spool valve 3 is in its illustrated state, the hydraulic pressure release chamber 34 is communicated with the end brake port 10 through a first output groove 3b formed in the first spool valve 3.

Numeral 37 denotes a pilot piston disposed within a bore portion 12a of the piston 12 and which is operated by the hydraulic fluid. Numeral 38 denotes a communication groove formed in both the outer peripheral surface of the piston 12 and the cylinder inner surface along which the outer peripheral surface of the piston slides. Numeral 39 denotes a pilot chamber. Numeral 40 denotes a pilot port which is connected through a pipe 42 to a hydraulic fluid supply means 41 for remote control and which supplies the hydraulic fluid from the hydraulic fluid supply means 41 to the pilot chamber 39 through the communication groove 38 and a small hole 43 formed in the piston 12.

In the above construction, when a hydraulic pump (not shown) is driven by an engine, the hydraulic fluid discharged therefrom is stored in the accumulators 21 and 22, from which it is then supplied to the accumulator ports 17 and 18 through pipes 19 and 20.

At this time, both first and second spool valves 3 and 4 are in the respective illustrated positions and the supply of the hydraulic fluid from the accumulators 21 and 22 to the end brake ports 10 and 11 is cut off, so the hydraulic fluid is not supplied to the end brakes 26, 27 and 28, 29, but is flowed back to the oil tank 25 through a valve (not shown).

Further, since the end brake port 10 is in communication with the hydraulic pressure release chamber 34 through the first output groove 3b formed in the first spool valve 3 and the end brake port 11 is in communication with the chamber 34 through the first output groove 4b formed in the second spool valve 4, further through the hydraulic pressure release chamber 33 and passage 36, the end brakes 26, 27 and 28, 29 connected to the end brake ports 10 and 11, respectively, are released from the chamber 34 to the oil tank 25 through the drain port 23 and pipe 24.

The following description is now provided about the case where the brake pedal is operated.

Upon depression of the brake pedal, the piston 12 is moved leftward in the FIGURE, so that the spring 13 is compressed and the first spool valve 3 is pushed in (operates leftwards in the FIGURE). The spring 16 has a spring constant sufficiently higher than that of the return spring 14, so when the first spool valve 3 is pushed in, the actuating force thereof is transmitted to the second spool valve 4 through the spring 16 and the plunger 5, so the second spool valve is also pushed in.

When the first and second spool valves 3 and 4 are thus pushed in, the first output grooves 3b and 4b formed therein move leftwards in the FIGURE, resulting in that the communication of the end brake ports 10 and 11 with the hydraulic pressure release chamber 34, that is, the communication thereof with the oil tank 25, is cut off.

As the first and second spool valves 3 and 4 are pushed in to a further extent, the accumulator ports 17 and 18 are brought into communication with the end brake ports 10 and 11 through second output grooves 3c and 4c formed in the first and second spool valves 3 and 4, respectively, so that the hydraulic fluid in the accumulator 21 and that in the accumulator 22 are transmitted through pipes 19, 20, accumulator ports 17, 18, end brake ports 10, 11 and pipes 30, 31 to the end brakes 26, 27 and 28, 29, respectively.

At this time, the hydraulic fluid in the end brakes 26, 27 and that in the end brakes 28, 29 are transmitted to the reaction hydraulic-pressure chambers 6 and 8 through small holes 9a and 9b, respectively. The hydraulic fluid in the chamber 6 acts as a pushing-back force for the first spool valve 3, whereby the valve 3 is pushed back up to a position where the said force balances with the biasing force of the spring 13. Thus, the operating force applied to the piston 12 balances with the hydraulic fluid in the end brakes 26, 27 and that in the end brakes 28, 29 through the spring 13, so that there is generated a hydraulic pressure proportional to the operating force. On the other hand, the hydraulic fluid in the reaction hydraulic-pressure chamber 8 acts as a pushing-back force for the second spool valve 4, so that the valve 4 is pushed back up to a position where the hydraulic pressure in the reaction hydraulic-pressure chamber 6 balances with the force operating on the plunger 5. As a result, the pressure of the hydraulic fluid in the chamber 6 and that in the chamber 8 become equal to each other, thus equalizing the pressure of the hydraulic fluid in the end brakes 26, 27 and that in the end brakes 27, 28 to each other.

Description is now directed to the case where remote control is made.

When the hydraulic fluid supply means 41 is driven by a remote control and hydraulic fluid is supplied to the pilot port 40 through pipe 42, the hydraulic fluid is introduced into the pilot chamber 39 through the communication groove 38 and small hole 43 and acts as a force for moving the pilot piston 37 leftwards in the FIGURE. Therefore, like the case where the piston 12 is moved leftwards in the FIGURE upon depression of the brake pedal, the pilot piston 37 is moved leftwards, so that the spring 13 is compressed and the first spool 3 is pushed in.

This actuating force is transmitted to the second spool valve 4 through the spring 16 and plunger 5, so that the valve 4 is also pushed in. Consequently, in the same manner as above, the accumulator ports 17 and 18 are communicated with the end brake ports 10 and 11, respectively, so that the hydraulic fluid in the accumulator 21 and that in the accumulator 22 are transmitted through pipes 19, 20, accumulator ports 17, 18, end brake ports 10, 11 and pipes 30, 31 to the end brakes 26, 27 and 28, 29, respectively.

According to this embodiment, since the pilot piston 37 is disposed within the piston 12 and it is operated by hydraulic fluid as in the ordinary operation based on the operation of the brake pedal, a remote control can be made by only piping with the hydraulic fluid supply means 41 for remote control, that is, without using such a complicated structure as link motion.

Besides, since a remote control can be made by only adding pilot piston 37, pilot chamber 39 and pilot port 40 into a conventional apparatus, it is possible to omit the remote control member mounting work.

According to the foregoing construction, moreover, by changing the diameter of the pilot piston 37, the same pressure as in the conventional brake pedal operation can be generated in the hydraulic fluid fed from the hydraulic fluid supply means 41 for remote control.

Further, since the pilot piston 37 is incorporated within the piston 12, there is no fear of increase in the apparatus size.

Although in the illustrated embodiment the present invention is applied to a dual system brake, the invention is also applicable to a single system brake.

What is claimed is:

1. A control valve assembly for a total pressure hydraulic brake, comprising:
   a first input port connected inputtably to hydraulic fluid supply means for said brake;
   an output port connected outputtably to a brake system;
   a second input port connected inputtably to hydraulic fluid supply means for remote control;
   a first response member which is moved in accordance with only a depressing force exerted on a brake pedal;

a second response member which is moved together with said first response member when the depressing force is exerted on the brake pedal, and which is moved relatively to said first response member by the hydraulic fluid flowing through said second input port; and control means which makes open/close control for the hydraulic fluid from said first input port in accordance with the movement of either said first response member or said second response member or both of them and supplies the hydraulic fluid from said first input port to said output port.

2. A control valve assembly according to claim 1, wherein said first response member is constituted by a piston, a bore portion which is open toward the front is formed in said piston, a pilot piston serving as said second response member is disposed movably within said bore portion, and a pilot chamber is formed between said piston and said pilot piston.

3. A control valve assembly according to claim 2, wherein said pilot chamber is connected to said remote control input port.

4. A control valve assembly according to claim 3, wherein said pilot chamber is in communication with said remote control input port through a communication groove formed in both an outer peripheral surface of said piston and a cylinder inner surface along which said outer peripheral surface of the piston slides, and further through a small hole formed in the piston.

5. A control valve assembly according to claim 1, wherein said control means is constituted by a spool valve.

* * * * *